April 25, 1950 W. VINNICK 2,505,311
SNOW AND ICE REMOVER FOR MOTOR VEHICLES
Filed July 18, 1949 2 Sheets-Sheet 2

INVENTOR.
William Vinnick
BY *Christian P. Nielsen*
ATTORNEY

Patented Apr. 25, 1950

2,505,311

UNITED STATES PATENT OFFICE 2,505,311

SNOW AND ICE REMOVER FOR MOTOR VEHICLES

William Vinnick, Flushing, N. Y.

Application July 18, 1949, Serial No. 105,389

5 Claims. (Cl. 37—12)

This invention relates to an apparatus attached to an automobile for removing snow and ice at the rear wheels of the automobile.

An object of the invention is the provision of an apparatus attached to an automobile for removing areas of snow and ice at the rear wheels of the automobile wherein a portion of the exhaust gases is conducted through a scraper adapted to be projected, when desired, in front of the rear wheels for aiding in removing snow and ice from the path of the wheels, said exhaust gases not only heating the scraper but melting snow and ice when projected thereon.

A further object of the invention is the provision of a manually actuated scraper which is projected into the path of the rear wheels and in advance thereof for not only aiding in removing snow and ice from the path but for aiding in stabilizing the rear wheels when the car tends to skid, a portion of the exhaust gases being conducted through a pipe in each scraper tends to heat the scraper for materially assisting in removing the snow and ice, the heated exhaust gases being discharged from the pipe directly onto the snow and ice to melt the same.

The invention is best understood from a consideration of the following detailed description taken in conjunction with the accompanying drawings forming part of this specification, nevertheless, it must be borne in mind that the invention is not confined to the disclosure, but is susceptible of such changes and modifications as shall define no material departure from the salient features of the invention as expressed in the appended claims.

In the drawings:

Figure 4 is a view in perspective of the ice and snow removing device per se, separated from its attachments with the chassis of an automobile.

Figure 1:
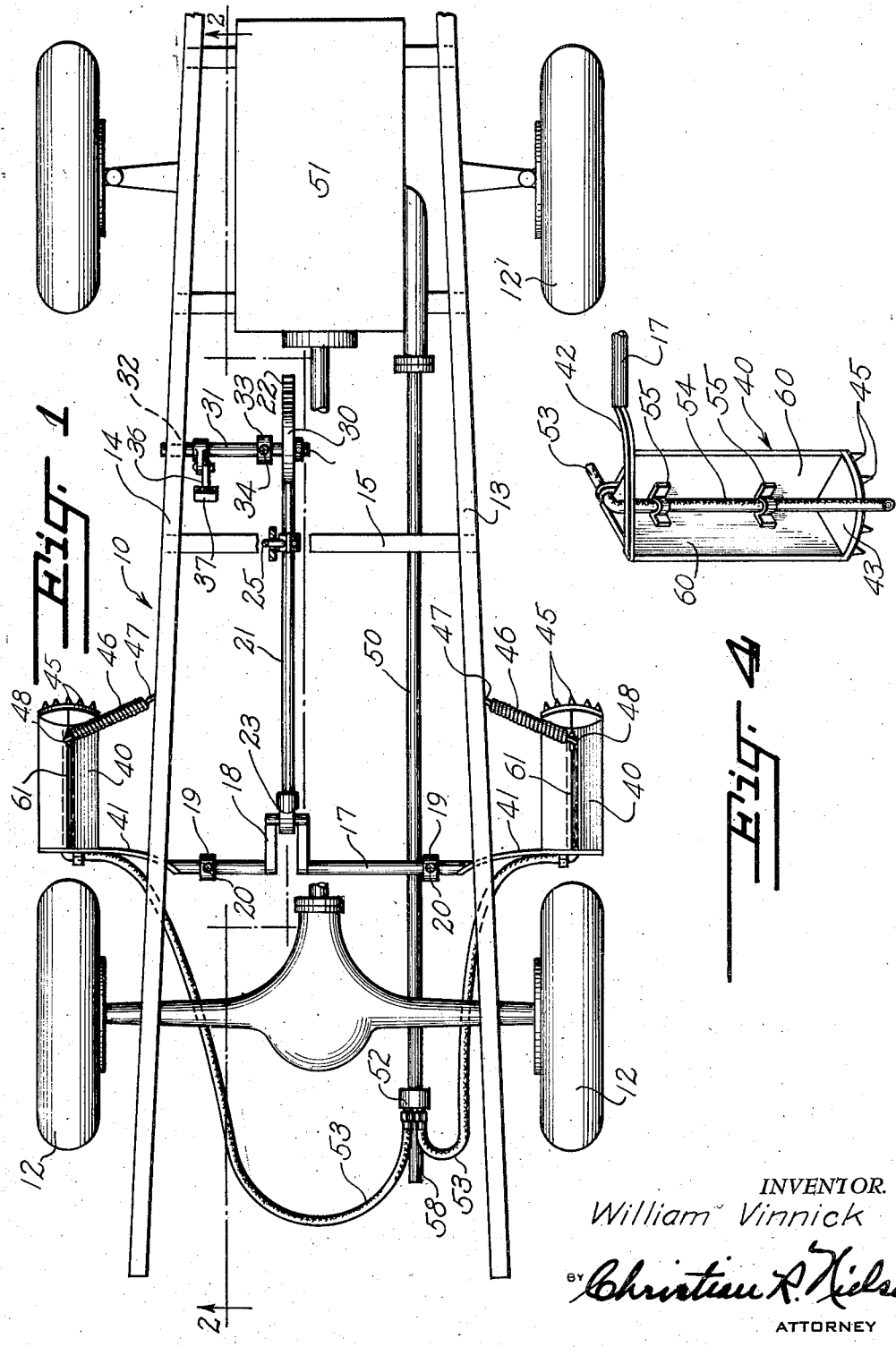
Figure 1 is a top plan view of a chassis of an automobile with parts broken away and in section showing my apparatus applied thereto for removing snow and ice from the path of the rear wheel of the vehicle.

Referring more particularly to the drawings 10 designates generally a chassis of an automobile including a frame 11 supported by rear wheels 12 and front wheels 12'. I-beams 13 and 14 and cross bars 15 and 16 form part of the frame. The opposite ends of the frame are carried in the usual manner by spring-suspensions (not shown).

A shaft 17, having a crank 18 intermediate the ends thereof, is mounted in bearings 19 suspended by bolts 20 from the cross bar 16. A pitman 21, having a rack 22 at the free end thereof is pivotally connected at 23 with the crank 18. An elongated annular link 25 has one end pivotally connected at 26 with a collar 27 mounted on the pitman or reciprocating rod 21 adjacent the rack 22. The other end of said link is received by a curved slot 28 formed in a bracket 29 secured to the transverse bar 15. The link supports and guides the free end of the rod 21 and maintains the rack 22 in contact with a segmental gear 30.

The gear is rigid with a shaft 31 mounted in bearings 32 and 33. The bearings 32 are fixed to the I-beam 14 while the bearing 33 is suspended by a bolt 34 which may be secured to a floor board adjacent the driver's seat. A lever 35 has one end rigid with the shaft 31, the other end thereof being pivotally connected with the shank 36 of a foot pedal 37. The shank is movable through an opening 38 in a floor board 39.

A boot 40, formed of metal and V-shaped in cross section, is located in front of each rear wheel 12. A bar 41 has one end secured rigidly to the top of a boot while the other end 42 is curved and rigid with the adjacent end of the crank shaft 17, there being a bar 41 at each end of said shaft. The bottom of the boot is closed as shown at 43 and a curved foot 44 extends forwardly therefrom. The under surface of the foot and the bottom 43 are provided with a plurality of depending spikes 45 adapted to break up the snow and ice in front of the rear wheels 12. A coil spring 46 is connected between the adjacent I-beams and the front edges of the boots as shown respectively at 47 and 48.

An exhaust pipe 50 extends from the engine 51 and terminates in a cylinder 52 at the rear end of the automobile (Figure 1). Flexible branch pipes 53 extend from said cylinder. Each pipe is carried downwardly through an adjacently disposed boot (Figure 4) as shown at 54 and connected thereto by clips 55. Each pipe has a rearward extension 56 terminating adjacent the wheels 12 for directing the hot exhaust gases onto the snow and ice at points where the thread of the tire engages the roadbed. A pipe 58, connected with the cylinder 52, releases some of the exhaust to the atmosphere to prevent the exhaust from creating a back pressure on the engine 51.

Figure 2:
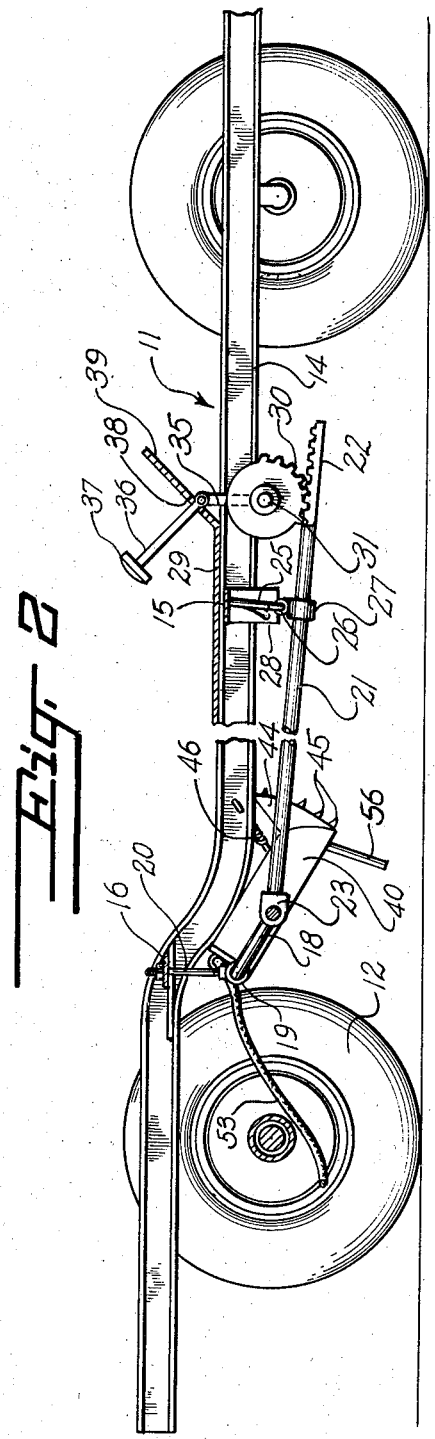
Figure 2 is a longitudinal vertical section taken along the line 2—2 of Figure 1 showing my ice and snow removing apparatus in an inoperative position.
Figure 3:
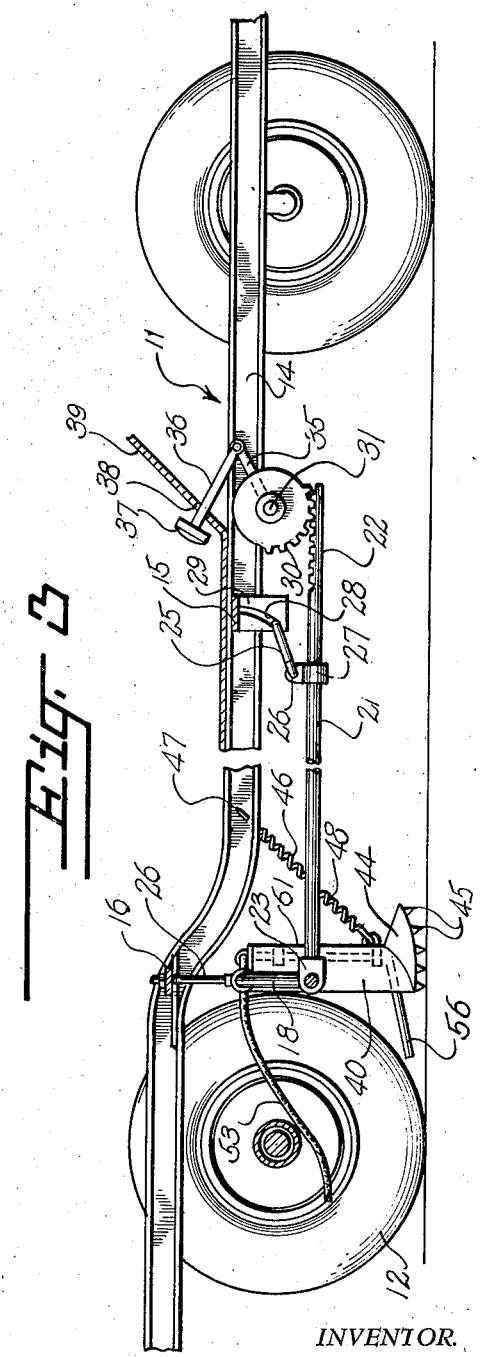
Figure 3 is a similar longitudinal vertical section of the chassis with the snow and ice removing apparatus disposed in an operative position.

The operation of my device is as follows:

When ice or snow or both are on the roadbed and the rear wheels spin, the boots are moved from the inoperative position shown in Figure 2 to the positions indicated in Figure 3 by depressing the special foot pedal 27 which causes rotation of the segmental gear 30 and rearward reciprocation of the rod 21. The crank 18 is oscillated thereby rocking the shaft 17 and the attached boots 40.

The boots may be rocked a number of times for cutting the ice and snow in front of the wheels 12. Each time pressure is released on the foot pedal 37 the coil springs 30 return the boots to inoperative positions.

It will be noted from Figure 2 that the extensions 56 of the exhaust branch pipe 53 projects downwardly towards the roadbed when the boots 40 are in inoperative positions, however, when the pedal 37 is depressed, said extensions will swing to the positions shown in Figure 3. The pedal 37 may be retained in such position until the snow or ice or both have been melted. The boots may be rocked for breaking up the ice and snow which is being melted. Furthermore, some of the heat from the portions 54 of the branch exhaust pipes 53 is transferred to the boots which will aid in removing the snow or ice.

As shown in Figure 4, each boot consists of a pair of vertical side walls 60 which are joined at the forward edges to provide a cutter 61. The side walls are angularly disposed relative to each other. The bars 42 and the bottoms 43 connect respectively the tops and bottoms of the side walls together. Said bottoms, in effect, form the heels of the boots. The angularly disposed side walls disperse the snow to the opposite sides of the path of travel of the rear wheels.

The boots not only provide means for removing snow and ice from the paths of the rear wheels 12, but said boots may be employed for stabilizing an automobile during skidding. At this time the boots are projected downwardly whereby the spikes 45 will engage the roadbed and hold the rear wheels from sliding.

What I claim:

1. In an automobile including a frame supporting an exhaust pipe from an engine, an apparatus for removing ice and snow where the rear wheels of the automobile contact the roadbed comprising a boot at each side of the frame, means rockably supporting the boots, spikes projecting downwardly from each boot and engageable with snow or ice on the roadbed in front of the rear wheels of the automobile, means for rocking the boots in one direction, springs moving the boots in the opposite direction, and branch pipes projecting from the outer end of the exhaust pipe and passing through the boots for heating said boots, each branch pipe having an extension projecting from a boot for discharging exhaust gases onto the snow and ice between the wheels and the roadbed, said rocking boots and the heated exhaust gases cooperating to remove the snow and ice from the roadbed where the rear wheels contact said bed.

2. In an automobile including a frame, an apparatus for removing snow and ice from the road bed adjacent the rear wheels comprising a boot at each side of the frame, a rock shaft mounted on the frame, manual means for rocking the shaft, means connecting the top of each boot to an end of said shaft so that when the shaft is rocked the boots will be oscillated, each boot being angular shaped in cross section and having a closed bottom, a foot extending forwardly from the closed bottom, spikes projecting downwardly from the foot and closed bottom adapted to break up snow and ice in front of the rear wheels of the automobile when the boots are oscillated, the boots being formed principally of a pair of side walls angularly disposed relative to each other and joined together at the forward edges to provide cutters.

3. In an automobile including a frame, an apparatus for removing snow and ice from the road bed adjacent the rear wheels comprising a boot at each side of the frame, a rock shaft mounted on the frame, manual means for rocking the shaft, means connecting the top of each boot to an end of said shaft so that when the shaft is rocked the boots will be oscillated, each boot being angular shaped in cross section and having a closed bottom, a foot extending forwardly from the closed bottom, spikes projecting downwardly from the foot and closed bottom adapted to break up snow and ice in front of the rear wheels of the automobile when the boots are oscillated, the boots being formed principally of a pair of side walls angularly disposed relative to each other and joined together at the forward edges to provide cutters, and means for heating the boots.

4. In an automobile including a frame, an apparatus for removing snow and ice from the road bed adjacent the rear wheels comprising a boot at each side of the frame, a rock shaft mounted on the frame, manual means for rocking the shaft, means connecting the top of each boot to an end of said shaft so that when the shaft is rocked the boots will be oscillated, each boot being formed of a pair of vertical side walls joined together at the forward edges to provide cutters, said side walls being disposed at an angle to each other, the boots being V-shaped in cross section, the bottoms of the boots having downwardly depending spikes for cutting through ice and snow on the roadbed in front of the rear wheels.

5. In an automobile including a frame, an apparatus for removing snow and ice from the road bed adjacent the rear wheels comprising a boot at each side of the frame, a rock shaft mounted on the frame, manual means for rocking the shaft, means connecting the top of each boot to an end of said shaft so that when the shaft is rocked the boots will be oscillated, each boot being formed of a pair of vertical side walls joined together at the forward edges to provide cutters, said side walls being disposed at an angle to each other, the boots being V-shaped in cross sections, the bottoms of the boots having downwardly depending spikes for cutting through ice and snow on the roadbed in front of the rear wheels, and means for heating the boots and projecting hot gases onto the snow and ice where the rear wheels contact the road bed.

WILLIAM VINNICK.

No references cited.